(12) United States Patent
Pyle (10) Patent No.: US 6,612,380 B2
(45) Date of Patent: Sep. 2, 2003

(54) TRACTOR ATTACHMENT FOR THREE POINT HITCH

(76) Inventor: Donald D. Pyle, 1550 Old Town Rd., Stonefort, IL (US) 62987

( * ) Notice: Subject to any disclaimer, the term of this patent is extended or adjusted under 35 U.S.C. 154(b) by 0 days.

(21) Appl. No.: 09/912,888

(22) Filed: Jul. 25, 2001

(65) Prior Publication Data

US 2003/0019643 A1 Jan. 30, 2003

(51) Int. Cl.[7] .................. A01B 59/00; A01B 59/043
(52) U.S. Cl. ........................... 172/439; 172/677
(58) Field of Search .................. 172/439, 444, 172/445.1, 677, 679, 248; 280/460.1, 461.1, 508

(56) References Cited

U.S. PATENT DOCUMENTS

| | | | |
|---|---|---|---|
| 4,340,240 A | | 7/1982 | Anderson |
| 5,513,869 A | * | 5/1996 | Putnam .................. 280/415.1 |
| 5,529,329 A | * | 6/1996 | McCoy ..................... 280/437 |
| 5,788,257 A | * | 8/1998 | Meyerhofer ............. 280/416.1 |
| 6,024,372 A | * | 2/2000 | Colibert et al. .......... 280/416.1 |
| 6,125,945 A | * | 10/2000 | Skaggs et al. ............. 172/439 |
| 6,135,482 A | * | 10/2000 | Larkin ..................... 280/416.1 |

* cited by examiner

Primary Examiner—Thomas B. Will
Assistant Examiner—Alicia Torres
(74) Attorney, Agent, or Firm—Polster, Lieder, Woodruff & Lucchesi, L.C.

(57) ABSTRACT

An attachment, primarily for a tractor having a three point hitch, has a post with a seat for a gooseneck hitch ball, and mounting brackets for a fifth wheel type hitch that permit a limited amount of pitch and roll.

5 Claims, 7 Drawing Sheets

TRACTOR ATTACHMENT FOR THREE POINT HITCH

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates generally to towing attachments mounted on vehicles. It is especially well adapted to be employed with a tractor with a three point hitch, alternatively to provide a fifth wheel hitch or a gooseneck hitch. It has particular, but not exclusive, application to a Category 3 tractor.

A wide array of loads, and many configurations and styles of load carriers, such as trailers and flat-beds are pulled by tractors with a three point hitch. Such tractors have the capacity to pull many loads over rough terrain, but are not intended to pull such heavy loads as a heavily loaded trailer such as the type pulled over the road by eighteen wheelers, but for pulling fifth wheel trailers such as farmers use on small type trucks. A three point hitch comprises two hydraulically operated arms spaced horizontally from one another in one plane, extending from the rear of the tractor, and a third pivoted arm, generally equidistant from the two arms and above the plane of the two arms; also extending from the rear of the tractor and oriented so that the three arms form three points of a triangle. In the device described, the third arm is threaded at one end and connected at that end by a yoke to the tractor and by a pintle at the other end to the attachment of this invention. Making the third arm manually adjustable is conventional, and forms no part of this invention. conventionally the three point hitch is attached directly or through a frame connected to the three arms, to a load carrier that is to be pulled by the tractor.

There are many occasions when it is desired to move a load carrier equipped with a gooseneck or a fifth wheel hitch receiver. A gooseneck hitch is a hitch in which a ball is received in a socket carried by the load carrier, the load carrier's weight then being counterbalanced by the hitch and its own contact with the ground.

A fifth wheel hitch has on the load carrier a downwardly depending post, often with a spherical terminus, extending from a flat bearing surface. The prime mover has a plate with a hole in it to receive the post, the plate serving as a load bearing surface complementary to that of the load carrier. In the fifth wheel hitch, the hole into which the post extends usually takes the form of a notch in the rearwardly facing edge of the prime mover plate, and jaws, defining between them the "hole", which are opened when the post is put into position, and closed and locked in position after the post has been properly positioned. The plate's generally smooth surface faces upwards, and the rearward portion is angled downward to provide a ramp. The bearing surface of the load carrier rests against this plate, which is well greased.

As recited in U.S. Pat. No. 4,340,240, normally a tractor three point hitch is capable of engagement with but one arrangement of implement attachment points, and none has been adapted to handle both a gooseneck and a fifth wheel type of the kind described above. The gooseneck and fifth wheel types are often associated with quite different vehicles. For instance, it is common for a flat-bed pickup truck to have a gooseneck attachment directly over the rear differential of the truck. It is common for a semi-trailer rig to incorporate a fifth wheel hitch.

BRIEF SUMMARY OF THE INVENTION

The present invention provides a tractor attachment connected to a standard three point hitch which is adapted to provide a hitch for load carriers heretofore considered not compatible with a three point hitch. The attachment may readily manually be converted to a gooseneck hitch, or to a fifth-wheel hitch.

DETAILED DESCRIPTION OF THE INVENTION

The following detailed description illustrates the invention by way of example and not by way of limitation.

Figure 1:
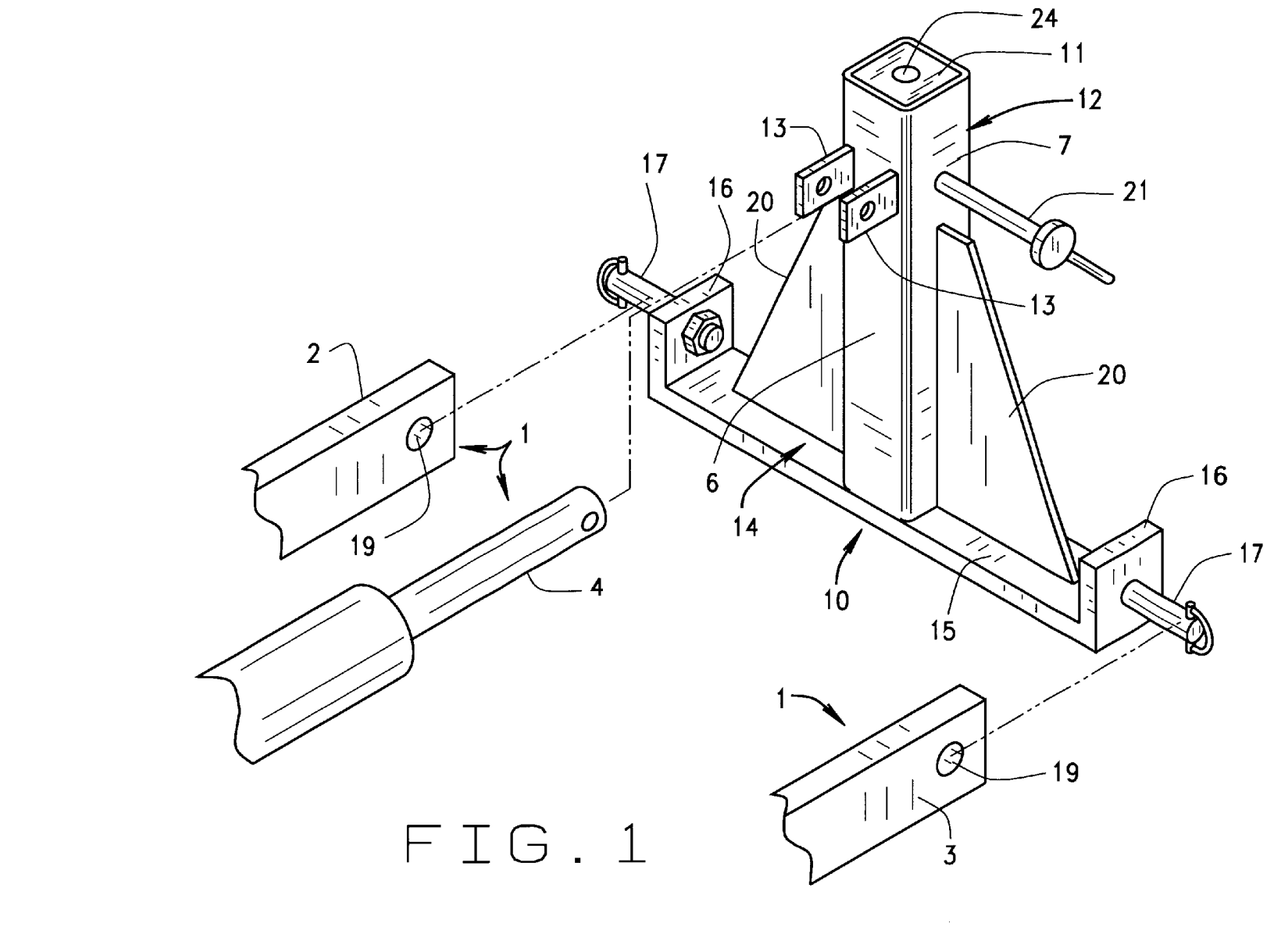
FIG. 1 is a fragmentary, exploded perspective view of a body of one embodiment of attachment of the present invention and a three point hitch.

Referring to FIG. 1, reference numeral 10 indicates one illustrative embodiment of a frame of the attachment of the present invention. The frame 10 is mounted to a three point hitch 1. The three point hitch 1 includes two arms 2 and 3 of a fixed length, with means, not here shown, for raising and lowering them, such means, usually hydraulic, being conventional, and a third arm 4, the length of which is adjustable. The three arms 2, 3, and 4 form the three points of a triangle.

The frame 10 includes a center post 12, and bottom plate 14 with a flat upper surface 15. The center post 12 is a square, hollow post, welded at a lower end to the upper surface 15 of the bottom plate 14. The post 12 has a front wall 5, a rear wall 6, side walls 7, and a heavy top wall 11 welded into an upper end of the post. The bottom plate 14 has two flanges 16, perpendicular to the surface 13 of the plate, one on each end of the bottom plate 14. Each of the flanges 16 has a passage through it of a size to admit a threaded shank of a hitch pin 17. The shank is reduced in diameter with respect to the rest of the pin 17, to provide a shoulder that bears on the outside surface of the flange when a nut 18, threaded on the shank, is tightened against the inside surface of the flange, as shown in FIG. 1. The pins 17 are mounted in holes 19 in the arms 2 and 3 of the three point hitch. The third arm 4 is hingedly mounted to the post 12 between ears 13 welded to the rear surface 6 of the post, as indicated in FIG. 1, by means of a pintle pin extending through a passage in an end of the arm 4 and aligned holes in the ears 13.

The frame 10 further includes two gusset plates 20. The plates 20 are generally triangular, and each plate 20 is welded to a side wall 7 of the center post 12 and to the upper surface 15 of the bottom plate 14, for structural support.

The top wall 11 of the post has a central seat in the form of a hole 24 in it to receive a gooseneck ball mount 130. The front wall of the post has a window 9 cut in it to facilitate the installation and securement of the mount 130. The side walls 7 have aligned passages to receive a mounting pin 21 for use with the fifth wheel adaptor. The mounting pin 21 has a flange at one end.

Figure 14:
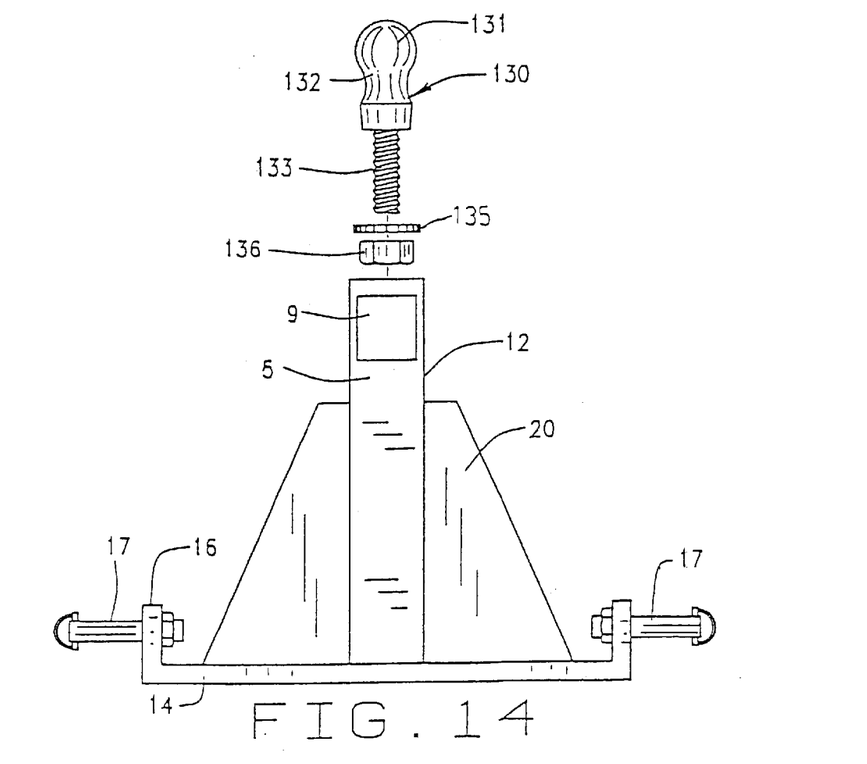
FIG. 14 is an exploded view in front elevation of the attachment of the present invention serving as a gooseneck hitch.

Referring now to FIG. 14, the attachment of this invention is shown as providing for a gooseneck hitch. The gooseneck adaptor 130 has a ball 131 on a neck 132, and a threaded shank 133. As the gooseneck adaptor 130 is inserted into the seat 24, the shank 133 is visible through the window 9. A lock washer 135 is mounted around the shank through the window 9, and a nut 136 is inserted through the window 132 and threaded onto the shank 133 to secure the adaptor 130 in the seat 24.

Referring now to FIGS. 2 through 13, for the adaptation of the attachment to a fifth wheel hitch, the center post 12 receives over and around its top end a post bracket 32. The post bracket 32 has a central sleeve 33, with a hollow lower portion 34 that is square and fits closely over the upper end of the center post 12, and a tapered upper portion 35 defined by two spaced parallel walls 36, integral with front and rear walls of the lower portion 34. Aligned passages 37 extend through the upper portion 35. Saddles 38 are welded to an inner face of both of the walls 36 below the passages 37, to serve as convenient locators for a wheel mount bracket, as will be explained hereinafter. The rear wall of the lower portion of the post bracket is cut away to accommodate the ears 13 on the post 12, which ears can function as locating stops. The post bracket 32 is secured to the center post 12 with the pin 21, extending through holes in side walls of the lower portion 34 perpendicular to the walls 36, and through aligned holes in side walls of the post 12.

The post bracket 32 includes two laterally extending arms 40, welded to the side walls of the lower portion 34. Each of the laterally extending arms (see FIG. 5) has, at its outer end two, upwardly extending, divergent tongues 41, which flare outwardly, upwardly. The tongues 41 are spaced from one another at their lower ends by the width of the arms 40.

A fifth wheel mount bracket 50 (see also FIG. 8) includes a center cylindrical-bearing 52, aligned with the passages 37 in the post bracket, through which a heavy pivot pin 44 passes. The pin 44 has a flange at one end with a hole through it. A threaded hole in the part 34 immediately below the flange of the pin 44 when it is installed, receives a threaded bolt, which passes through the hole in the flange, and holds the pin 44 in place. The bearing 52 is welded on its top to a lower flat surface of a center plate 54. The mount bracket 50 also includes a reinforcing beam 55 welded to and structurally securing the bearing 52 and the center plate 54, as shown particularly in FIG. 4. The center plate 54 is elongatedly rectangular and includes at its two ends flanges 56, perpendicular to an upper and the lower flat surface of the center plate. Each flange has in it a bore 58 to receive a pivot pin 60. The bores 58 are aligned.

Figure 2:
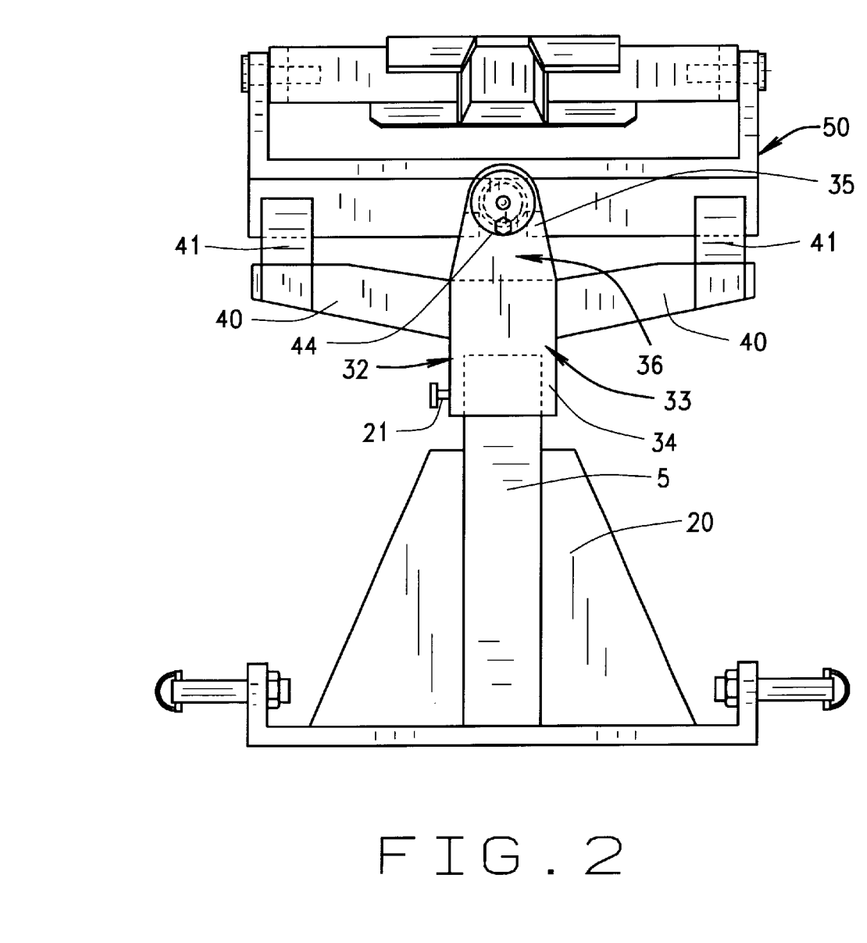
FIG. 2 is a view in front elevation of a completely assembled attachment serving as a fifth wheel hitch.
Figure 3:
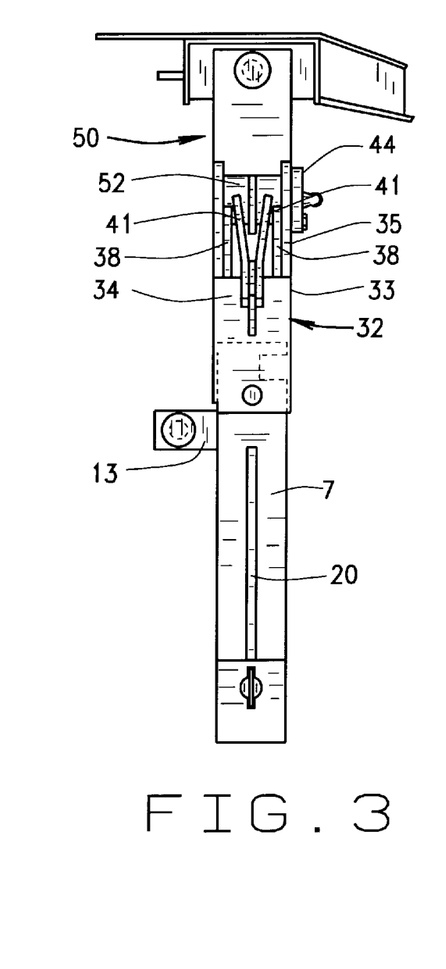
FIG. 3 is a view in side elevation of the attachment of FIG. 2.
Figure 4:
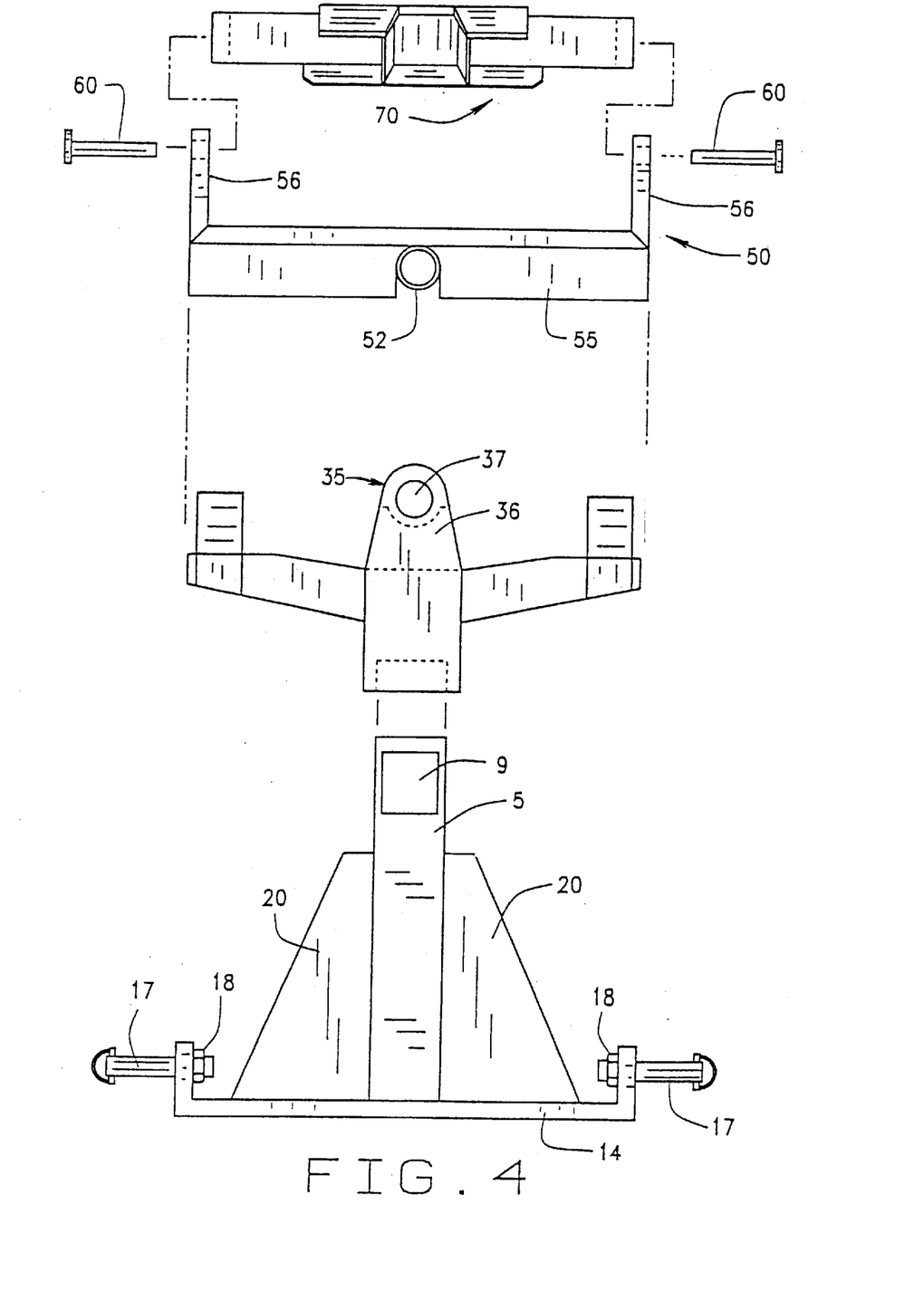
FIG. 4 is an exploded view in front elevation of the attachment of FIG. 2.
Figure 5:
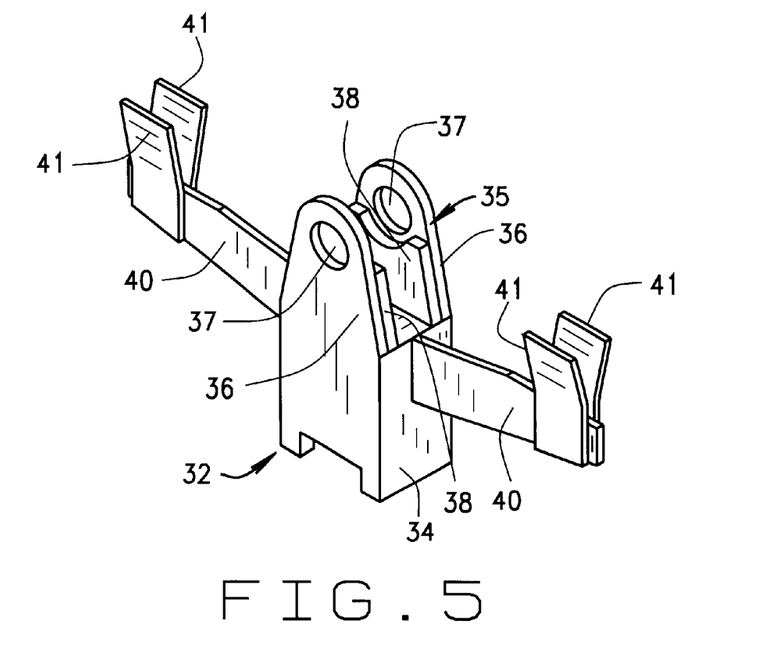
FIG. 5 is a view in perspective of a post bracket of the attachment of FIG. 2.
Figure 6:
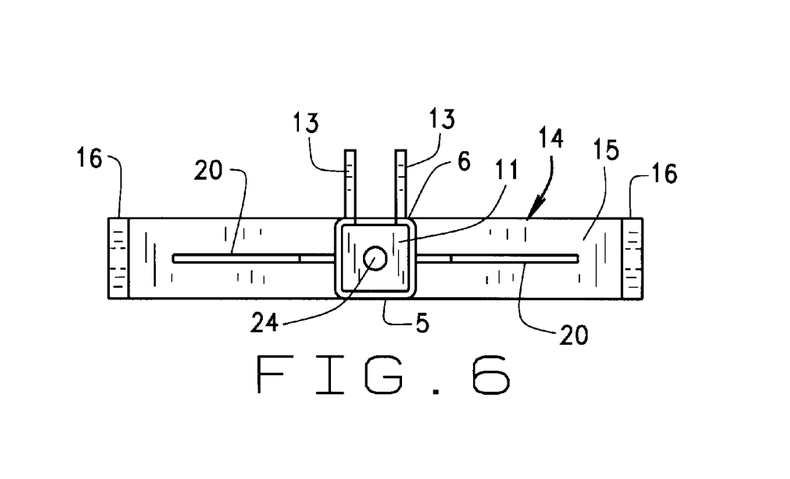
FIG. 6 is a top plan view of the body of FIG. 1, without pins.
Figure 7:
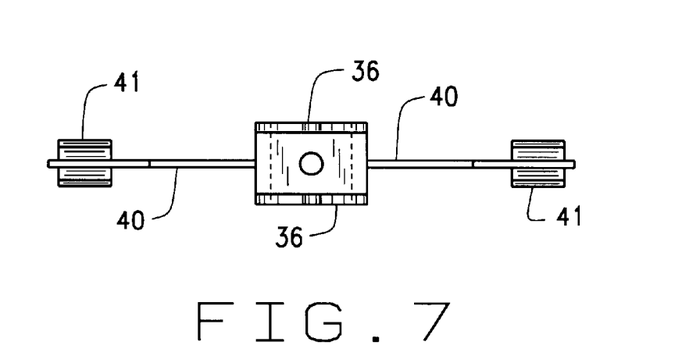
FIG. 7 is a top plan view of the post bracket of FIG. 5.
Figure 8:
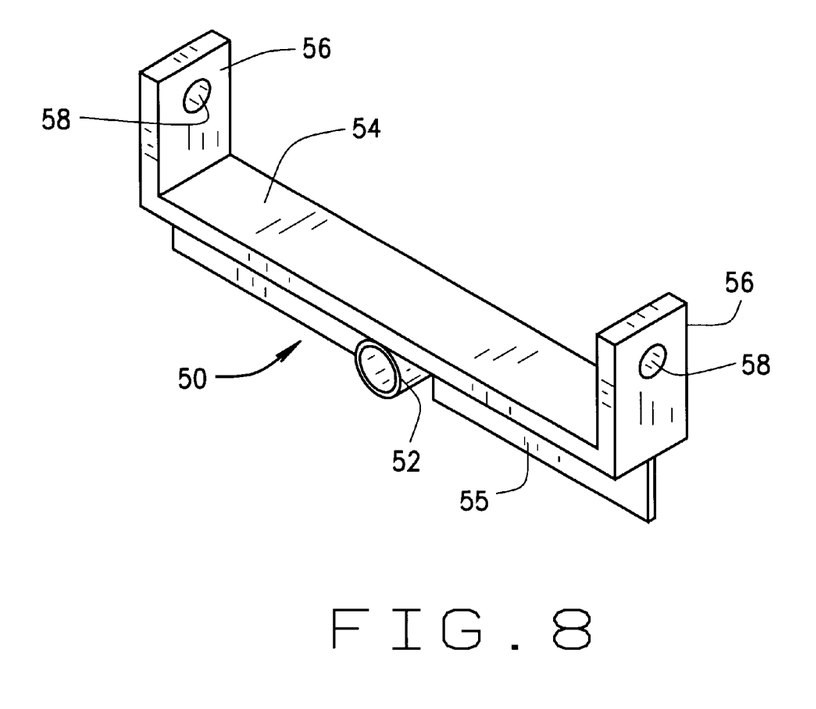
FIG. 8 is a view in perspective of a fifth wheel mount bracket of the first embodiment of FIG. 2.
Figure 9:
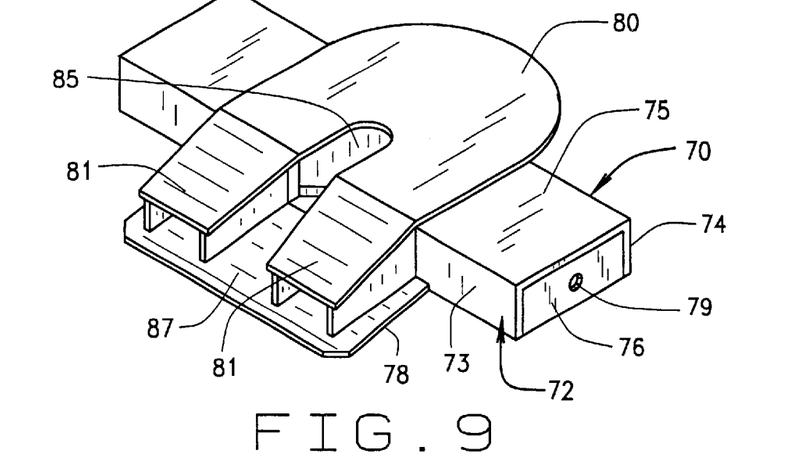
FIG. 9 is a view in perspective of a fifth wheel mount portion of the attachment of FIG. 2.
Figure 10:
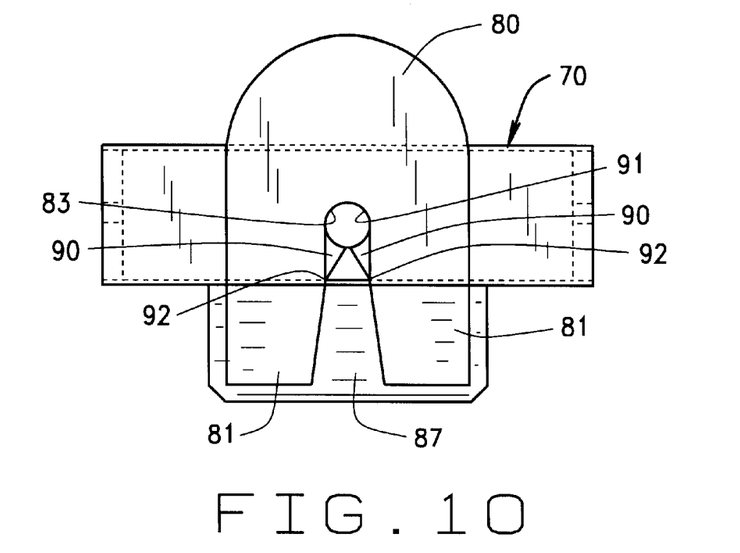
FIG. 10 is a top plan view of the fifth wheel mount of FIG. 9.
Figure 11A:
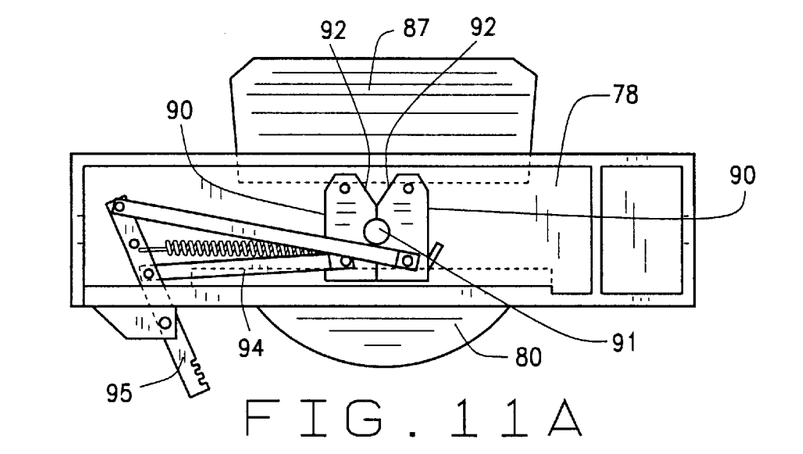
FIG. 11A is a bottom plan view of the fifth wheel mount of FIG. 9, with a jaw mechanism in a closed position.
Figure 11B:
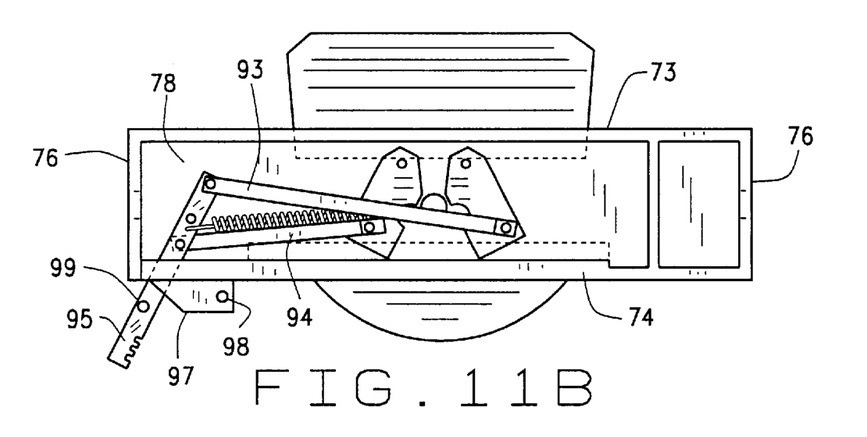
FIG. 11B is a view corresponding to FIG. 11A showing the jaw mechanism in an open position.
Figure 12A:
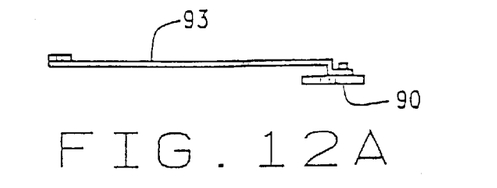
FIG. 12A is a view in side elevation of one jaw arm of the fifth wheel mount of FIG. 9.
Figure 12B:
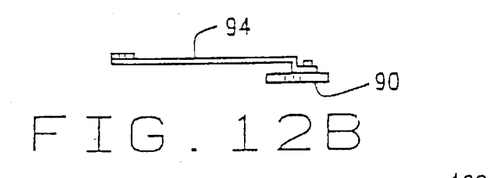
FIG. 12B is a view in side elevation of a second jaw arm of the fifth wheel mount of FIG. 9.
Figure 13:
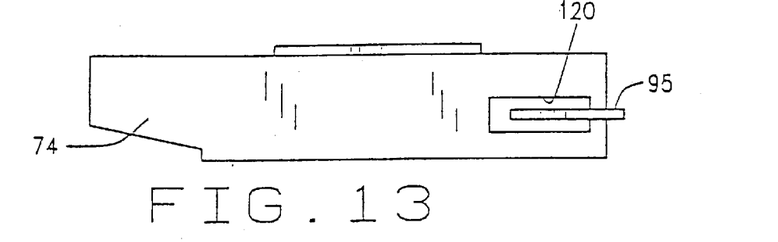
FIG. 13 is a view in rear elevation of the fifth wheel mount of FIG. 9.

The pivot pins 60, extending through the holes 58 in the bracket flanges 56 and corresponding holes 79 in end walls 76, pivotally secure a fifth wheel mount 70 (see FIG. 9) to the mount bracket 50, as shown in FIGS. 2 and 4. The fifth wheel mount includes a body 72 with front and rear side walls 73 and 74, a top wall 75, the end walls 76, and a bottom wall 78 (see FIG. 11A). The bottom wall 78 is recessed somewhat from the front, rear and end walls. A plate 80 is welded to the top wall 75. The plate 80 has a pair of ramp surfaces 81, sloping downwardly from the plane of the rest of the plate, and a U-shaped opening 83 in it, long sides of which define edges of the U-shaped opening. Supporting walls 85, extending between an apron 87 welded to the body and projecting forwardly of the body, and undersurfaces of the ramp surfaces 81. A post of a fifth wheel trailer passes through opening 83 at the bottom of the U. The plate 80 is smooth, and the ramps 81 allow the fifth wheel trailer to mate easily with the fifth wheel mount 70.

Two flat plate jaws 90, symmetrically arranged about the U-shaped opening, are pivotally mounted on the bottom plate 78. As shown particularly in FIGS. 11A and 11B, the jaws 90 have facing semicircular openings 91 in them to receive a necked part of a post depending from a bearing plate of a load carrier fifth wheel mechanism. Sloped edges 92 on the rear part of the plate jaws, where they are pivoted, help guide the neck of the post into the openings 91. The jaws are moved toward and away from one another by links 93 and 94, actuated by a lever 95. The lever 95 has a hole 99 in it. A tab 97, welded to the side plate 74, has a hole 98 in it positioned complementarily to the hole 99 in the lever 95, to receive a holding pin to ensure that the jaws remain closed around the neck of the load carrier post. Such arrangements are conventional. The rear wall 74 of the fifth wheel mount (see FIG. 13) has a slot 120 positioned in the margin of the wall 74 below the bottom wall 78, through which the lever 95 extends.

In assembling the fifth wheel hitch attachment, the post bracket 32 is merely slipped over the top of the post 12, and pinned to the post with the pin 21. The fifth wheel mounting bracket is then positioned with the bearing 52 between the walls 36, and permitted to move down until the bearing, guided by the saddles 38, rests on the saddles, centered with respect to the holes 37, and the heavy pin 44 is pushed through the larger of the holes 37 and the other end is threaded into the complementarily threaded hole 37 until a head on the pin engages a flat surface surrounding the hole. In this condition, the bar 55 is positioned between the ears 41. The fifth wheel mount 70 is positioned between the flanges 56, with the holes 58 and 79 aligned, and the pins 60 inserted. All or part of the assembly, from the bracket 32 on up, can be pre-assembled.

In order to move a load carrier over rough or uneven terrain, the tractor must not be rigidly connected to the fifth wheel. This is accomplished by the use of the attachment of this invention. In use, the fifth wheel hitch is free, within limits, to pitch, roll and yaw. The amount of roll permitted is determined by the configuration of the bar 55 and depth of the ears 41. The amount of pitch is determined by the clearance between the body 72 and the surface 54 of the bracket 50. The amount of yaw is determined by the characteristics of the load carrier, the tractor and load carrier being necessarily articulated if the tractor is to steer the load carrier.

Merely by way of illustration, the center post 12 can be made of ¼" steel, four inches by four inches on a side, and any desired height, such, for example, as 21". The top wall 11 can be 1" thick and the bottom plate 14, 1" thick, 4" wide and 26" long. The walls 36 of the post bracket can be ¾" thick. The bearing 52 can take the form of a pipe, 2½" o.d., 2" i.d., and the pivot pin 44, 2" o.d. (with just enough clearance in the bearing for a close but sliding fit), drilled axially to its longitudinal center to accommodate a grease fitting at one end, and radially to provide an outlet for grease at the center of the bearing. The dimensions of the other elements of the attachment are consistent with the foregoing. The actual dimensions form no part of this invention, but the foregoing provide some idea of the magnitude of the elements of one embodiment of the attachment.

Numerous variations in the construction of the attachment, within the scope of the claims, will occur to those skilled in the art in the light of the foregoing disclosure. Merely by way of illustration, the post 12 can be of any desired cross-sectional configuration, but preferably non-circular so as to provide positive restraint against rotation of the post bracket on the post. The tongues 41 can be differently formed, as long as they receive the bar 55 and limit the amount of roll permitted the load carrier. The attachment can be mounted on the three point hitch in other ways. For example, the arms 2 and 3 may have hook-like appendages instead of the holes 19, and the pins 17 may then have to be modified, as by having a wide flange at their outer end or a bale to accommodate the hook. The saddles 38 can be eliminated, but their provision makes for easy assembly. The gooseneck ball may be supported by a tapered shaft, seated in a complementarily shaped socket in the top of the post 12, with a pin or heavy clip to ensure that it does not come out, although in use, the weight of the load carrier will hold it in place. Various additional reinforcing members, in the form of gussets or channels, for example, may be employed. If the post bracket is properly configured, it can contain the gooseneck ball, so that the gooseneck ball can be fixedly secured in the top of the post 12 and the post bracket removably mounted around it. Although as has been indicated, the attachment of this invention has particular utility with tractors with three point hitches, and especially with Category 3 tractors, the attachment can be used with other tractors or other vehicles. In some cases it is desirable to attach front tractor weights to counterbalance the weight of the load carried, depending on tractor size and trailer size. These variations are merely illustrative.

What is claimed is:

1. An attachment for a three point hitch carried by a tractor having a long axis, said attachment comprising a post carried uprightly by said three point hitch, said post having an upper end adapted selectively to receive a gooseneck hitch and alternatively to mount an attachment for a fifth wheel type hitch, said fifth wheel type hitch comprising a post bracket having an open bottomed sleeve slidably mounted against rotation on said post, an elongated fifth wheel mounting bracket mounted at its longitudinal center on a fifth wheel mounting bracket pivot carried by said post bracket, said fifth wheel mounting bracket pivot having an axis generally parallel with the long axis of said tractor, whereby said fifth wheel mounting bracket can rock on said post bracket, and a fifth wheel mount pivotally mounted on and between two ends of said fifth wheel mounting bracket for rotation about pivots at said two ends, to permit rocking thereof about an axis perpendicular to the pivot axis of said fifth wheel mounting bracket and means for limiting the amount of rocking of said fifth wheel mounting bracket comprising arms extending from said post bracket sleeve perpendicular to said fifth wheel mounting bracket pivot axis, and upwardly divergent tongues carried by said arms, and said fifth wheel mounting bracket having a bar extending parallel to the said arms, and received within the ambit of said tongues.

2. An attachment for a three point hitch carried by a tractor having a long axis, said three point hitch having two, spaced arms, and between them, a central arm of adjustable length, said three point hitch attachment comprising a bottom plate, opposite ends of which are pivotally connected to said spaced arms, a post (5) fixed at a lower end to said bottom plate to extend uprightly and pivotally connected to said central arm, said post having an upper end receiving a fifth wheel type hitch attachment for mounting on and demounting from said post, said fifth wheel type hitch attachment comprising a sleeve (33) slidaby mounted against rotation on said post, said sleeve having spaced parallel walls with aligned passages to receive a first pivot pin oriented in a direction parallel to said long axis, an elongated fifth wheel mounting bracket (50) having a central reach (54) oriented transversely of said tractor long axis and upstanding flanges (56) at each end, said flanges having aligned bores receiving fifth wheel mounting bracket pivot pins, said elongated fifth wheel mounting bracket being mounted at the center of said central reach on said first pivot pin for rocking movement perpendicular to said long axis, and a fifth wheel mount (70) mounted on said fifth wheel mounting bracket pivot pins to permit rocking of said fifth wheel mount about an axis perpendicular to the pivot axis of said fifth wheel mounting bracket.

3. The attachment of claim 2 wherein said post upper end selectively receives a gooseneck hitch for mounting on and demounting from said post.

4. The attachment of claim 3 wherein said post has a heavy top wall with a seat in it to receive said gooseneck hitch, said gooseneck hitch including a ball and a threaded stem extending through said seat, and a nut on said threaded stem, said post having an opening in a wall below said top wall through which access may be had to said threaded stem and nut.

5. The attachment of claim 2 wherein arms extending from said sleeve in a direction perpendicular to the long axis of the trailer limit the amount of rocking of said fifth wheel mounting bracket.

* * * * *